United States Patent [19]

Boldridge, Jr. et al.

[11] 4,035,768
[45] July 12, 1977

[54] PERSONAL IDENTIFICATION APPARATUS

[75] Inventors: Austin G. Boldridge, Jr., Freehold, N.J.; Robert W. Freund, Brooklyn, N.Y.

[73] Assignee: Veripen, Inc., New York, N.Y.

[21] Appl. No.: 682,396

[22] Filed: May 3, 1976

[51] Int. Cl.² .......................................... G06K 9/00
[52] U.S. Cl. ...................... 340/146.3 SY; 73/432 R; 361/283
[58] Field of Search ......... 340/146.3 SY; 73/432 R, 73/432 A, 398 C, 88.5 R, 88.5 SD, 100; 317/262 A, 244–246, 249 R; 178/18, 19

[56] References Cited

U.S. PATENT DOCUMENTS

| | | | |
|---|---|---|---|
| 3,425,281 | 2/1969 | Barz | 73/398 C |
| 3,480,911 | 11/1969 | Danna | 73/432 R |
| 3,563,097 | 2/1971 | Roggenstein et al. | 340/146.3 SY |
| 3,624,619 | 11/1971 | Ambrosio | 178/18 |
| 3,858,097 | 12/1974 | Polye | 73/398 C |
| 3,911,215 | 10/1975 | Hurst et al. | 178/18 |
| 3,914,548 | 10/1975 | Barish | 178/18 |
| 3,962,679 | 6/1976 | Engelbrecht | 178/18 |

*Primary Examiner*—Leo H. Boudreau
*Attorney, Agent, or Firm*—Hane, Sullivan & Spiecens

[57] ABSTRACT

Apparatus used in identifying a person by means of pressure patterns associated with a signature comprises first and second spaced and parallel planar conductor elements with a lamina of elastomeric material on an exposed surface of one of the elements to provide a writing surface for a user who, by means of a stylus, exerts a varying pressure pattern via the lamina onto one of the elements to produce a varying capacitance signal.

2 Claims, 3 Drawing Figures

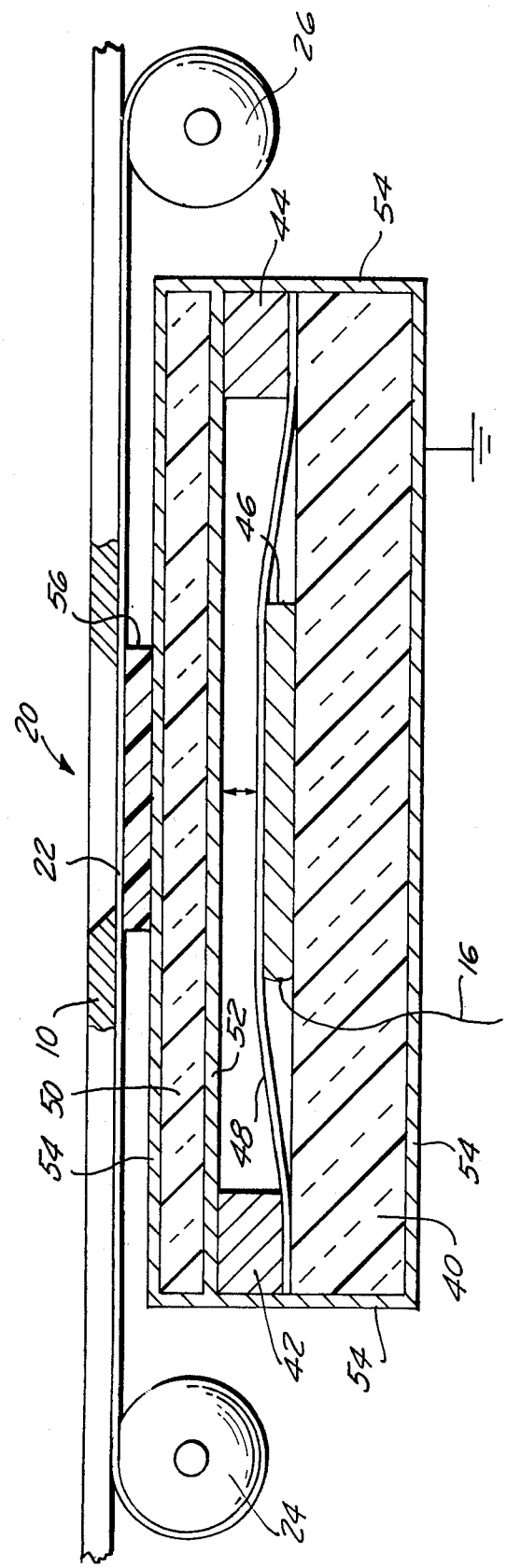

PERSONAL IDENTIFICATION APPARATUS

BACKGROUND OF THE INVENTION

This invention pertains to personal identification verifier apparatus and more particularly to such apparatus which utilizes signature pressure patterns in the identification process.

In many fields and particularly in personal identification field such as access security, banking and credit card operations, it is desirable to convert a person's signature to electrical signals which are then used in a verification and/or identification process. It has been found that when a person writes his signature he not only generates a unique visual pattern on a record medium, but he also generates a unique pressure pattern. The uniqueness of the pressure pattern has been exploited to build verification systems. Typical systems are disclosed in U.S. Pat. Nos. 3,480,911, 3,563,097 and 3,618,019, for example.

Some of these systems use pens with strain gauge transducers therein while other systems employ pressure sensitive writing surfaces. The transducer pens generally are very expensive and delicate and suffer low gauge factor/sensitivity and significant hysteresis. In fact, most of such pens break down when subjected to a high impact shock which occurs from the forceful dotting of an "i". In addition, the pen and associated wire are difficult to shield electromagnetically and are subject to data interception. Finally, the pen which dangles from the end of a cable is subject to theft and vandalism.

On the other hand, pressure sensitive tablets, while not being subjected to the same set of problems, create their own set. In particular, the major problem is associated with the nonlinearity of the generated signals because of the extended writing surface. In order to linearize the signal, complex and delicate systems using springs, strain gauges and the like are employed. Even with these expensive solutions, such devices still suffer from relatively high hysteresis and marginal natural frequency.

SUMMARY OF THE INVENTION

It is a general object of the invention to provide improved personal identification verifier apparatus.

It is another object of the invention to provide such apparatus which is more simple and more rugged than presently available apparatus.

It is further object of the invention to provide such apparatus which is extremely linear over its entire operating range.

These and other objects of the invention are satisfied by apparatus comprising first and second opposed planar conductor elements. A lamina of elastomeric material is fixed to the exposed surface of one of the planar conductor elements. There is also provided a stylus adapted to be gripped by the personal whose identification is to be verified for writing on the upper surface of the lamina. A utilization means sensitive to changes in the electrical capacitance resulting from the change in separation of the conductor elements in response to the pressure exerted by the stylus is connected to the conductor elements.

BRIEF DESCRIPTION OF THE INVENTION

Other objects, the features and advantages of the invention will be apparent from the following detailed description of the invention when read with the accompanying drawing which shows by way of example, and not limination, several embodiments of the invention. In the drawing:

FIG. 3 is a cross-sectional view taken along the line C—C of FIG. 1 according to another embodiment of the invention.

DESCRIPTION OF PREFERRED EMBODIMENTS

Figure 1:
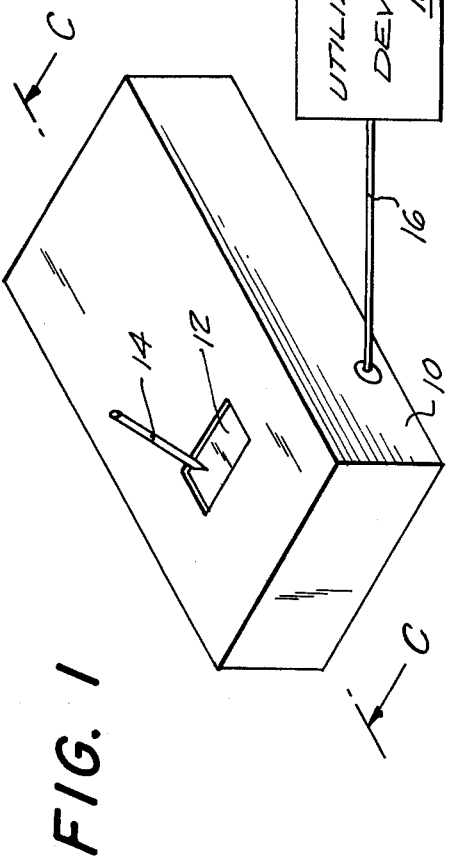
FIG. 1 is a perspective view of the pressure sensitive verifier apparatus according to the invention.

In FIG. 1 there is shown a verifier system including personal verifier apparatus having a housing 10 supporting a pressure sensitive writing tablet 12 and a stylus 14. When a user writes his signature or the line one writing surface of tablet 12, signals are generated which are fed via cable 16 to utilization device 18.

Figure 2:
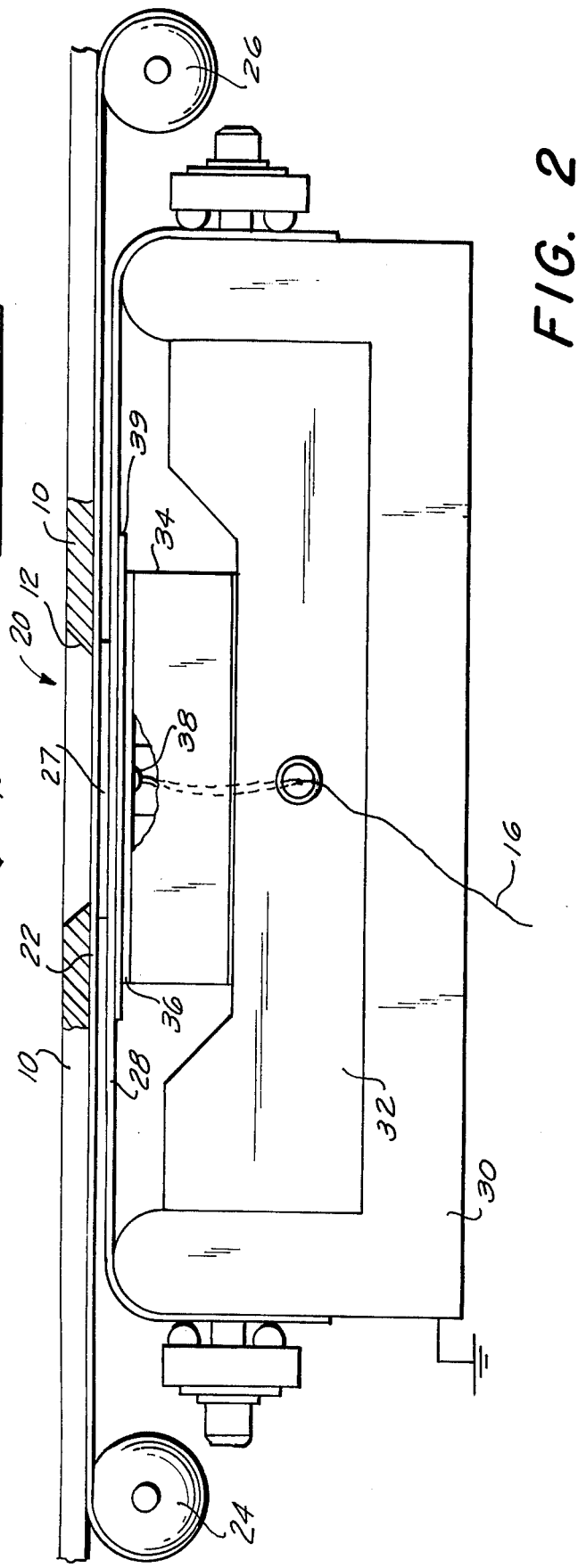
FIG. 2 is a cross-sectional view taken along the line C—C of FIG. 1 according to one embodiment of the invention.

More particular, according to the embodiment of FIG. 2 the apparatus comprises the housing 10 having a writing window 20. Extending across writing window 20 is a record medium such as paper or Mylar tape 22 which is moved by means not shown connected to reels 24 and 26. Tape 22 is a record medium upon which a user will write his signature to provide a visual record when stylus 14 is a ball point pen or the like. Below tape 22 within the region of window 20 the writing tablet 12 comprises a sheet or lamina writing pad 27 in the form of a moderately yieldable elastomeric material to provide a resilient writing surface which performs a further function hereinafter more fully described. A metallic cover plate 28 fixed to the upwardly extending walls of metal base plate 30 carries writing pad 27. A support structure 32 supports a block 34 of insulating material such as Teflon. On the top surface of block 34 is fixed a layer 36 of electrically conductive material which as aluminum foil. The bottom surface of the foil is soldered at 38 to cable 16 which passes through a passageway in block 34 and another in support structure 32. On top of layer 36 there is a sheet 39 of dielectric material such as Teflon. Thus a parallel plate capacitor is obtained from layer 36 and plate 28. The role of sheet 39 is to increase the capacitance between the layer 36 and plate 28 while still providing a workable spacing. It should be noted that in spite of sheet 40 there is still an air gap between the layer 36 and plate 28. When pressure is exerted on pad 27 the spacing between plate 28 and layer 36 changes, thus changing the capacitance.

In FIG. 3 there is shown another embodiment of the invention which has a simpler construction. Within the housing 10 there is again disposed the record medium 22 carried by reels 24 and 26. However, the writing tablet structure is simplified. In particular, there is a rectangular base plate 40 of glass having at opposite end regions spacers 42 and 44. Fixed to the top surface of member 40 is a layer or sheet 46 of conductive material such as aluminum foil. Cable 16 is connected to sheet 46 lying on the upper surface of the member 40 and sheet 46 is a sheet 48 of dielectric material such as Teflon. Fixed to the tops of the spacers is another rectangular top plate 50 of glass whose bottom surface is covered with a layer 52 of conductive material such as aluminum foil. The separated plates provide a capacitor whose gap is a combination of an air gap and a dielectric layer. Enveloping the plates is a layer of aluminum foil 54 to provide electromagnetic shielding. Fixed to the top surface of the foil 54 covering plate 50 in the region of the window is writing pad 56 of elastomeric material.

Similarly to the embodiment of FIG. 2 whenever pressure is exerted by the pen or stylus the spacing between the plates varies, varying the capacitance.

It should be noted that the spacing between the plates has been exaggerated for both embodiments. Typical spacings are in the order of 0.010 inch and the thickness of the Teflon sheet in the gap is in the order of 0.002 inch. This sheet provides the following advantages. It limis the excursion of the top plate to prevent bottoming and short circuiting due to unusual signer pressure.

It increases average dielectric constant between the plates effectively reducing the electrical distance and dynamic range of top plate excursion; and it provides an inexpensive reliable means of production calibration.

The elastomeric writing surface has the advantage of critically damping the excursions of the top plate as well as precluding dimpling of the upper surface by signer induced force.

There will not be obvious to those skilled in the art many modifications and variations satisfying many or all of the objects of the invention without departing from the spirit thereof as defined by the appended claims.

What is claimed is:

1. Personal identification verifier apparatus comprising a first planar conductor element, a second planar conductor element parallel to and opposite said first planar conductor element, a sheet of dielectric material disposed in the space between said first and second planar conductor elements, said sheet having a thickness which is less than the spacing between said planar conductor elements whereby there is an air gap between said planar conductor elements, a lamina of elastomeric material fixed on a portion of the surface of said second planar conductor element remote from said first planar element to provide a writing surface, a housing enclosing said first and second planar conductor elements, said housing being provided with an opening opposite said lamina of elastomeric material, a visual record medium spanning said first planar conductor element and overlying said lamina, a stylus adapted to be gripped by the person whose identification is to be verified for writing on the portion of the record medium opposite said lamina, and a utilization means connected to said first and second planar conductor elements and responsive to the changes in electrical capacitance as the thickness of the air gap changes in response to forces exerted on said second planar conductor element via said lamina and said record medium by said stylus when a person writes on said record medium.

2. The apparatus of claim 1 wherein said second planar conductor element is rigid and insulating means for supporting said second planar conductor element at two opposite edges thereof on said first planar conductor element whereby said second planar conductor element acts as a deformable plate in response to a force exerted by said stylus.

* * * * *